United States Patent
Oshima et al.

(10) Patent No.: US 7,232,232 B2
(45) Date of Patent: Jun. 19, 2007

(54) REFLECTOR DEVICE

(75) Inventors: Takeharu Oshima, Tokyo (JP);
Noboru Ito, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/569,272

(22) PCT Filed: Jul. 14, 2004

(86) PCT No.: PCT/JP2004/010032
§ 371 (c)(1),
(2), (4) Date: Feb. 23, 2006

(87) PCT Pub. No.: WO2006/006240
PCT Pub. Date: Jan. 19, 2006

(65) Prior Publication Data
US 2006/0221473 A1 Oct. 5, 2006

(51) Int. Cl.
*G02B 5/08* (2006.01)

(52) U.S. Cl. .................................. 359/849; 359/851

(58) Field of Classification Search ............... 359/878, 359/399, 851
See application file for complete search history.

(56) References Cited

U.S. PATENT DOCUMENTS 4,775,230 A 10/1988 Meier
4,825,062 A * 4/1989 Rather et al. ............ 250/201.1
5,592,336 A 1/1997 Saito et al.
2003/0112201 A1 6/2003 Mizuno

FOREIGN PATENT DOCUMENTS

JP 2002-182124 6/2002
JP 2003-227986 8/2003

* cited by examiner

*Primary Examiner*—Alessandro Amari
*Assistant Examiner*—Aline D. McNaull
(74) *Attorney, Agent, or Firm*—Oblon, Spivak, McClelland, Maier & Neustadt, P.C.

(57) ABSTRACT

In a reflecting mirror, a plurality of segmented mirrors are grouped into a plurality of groups of a cluster, and are supported by a plurality of sub mirror cells. The plurality of sub mirror cells are supported by a mirror cell, and all the segmented mirrors are supported by the mirror cell. A reference cell is supported by a plurality of force support mechanisms disposed in the mirror cell with the reference cell being nearly in a weightlessness state. Projections and depressions are prevented from occurring in an axial direction of the reflecting mirror due to a self weight deformation, and the reference cell can be used as a reference surface for control of the positions of the plurality of segmented mirrors and those of the plurality of cluster mirrors in the axial direction of the reflecting mirror.

12 Claims, 7 Drawing Sheets

(a)

(b)

FIG.1
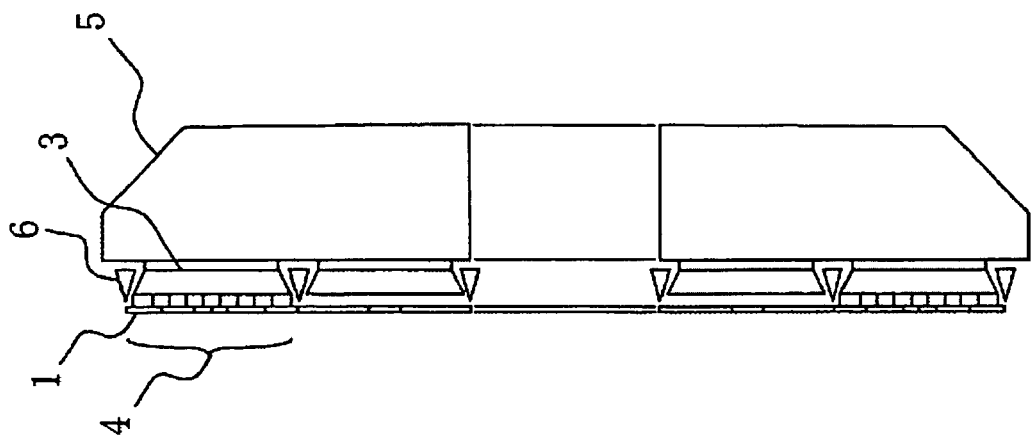
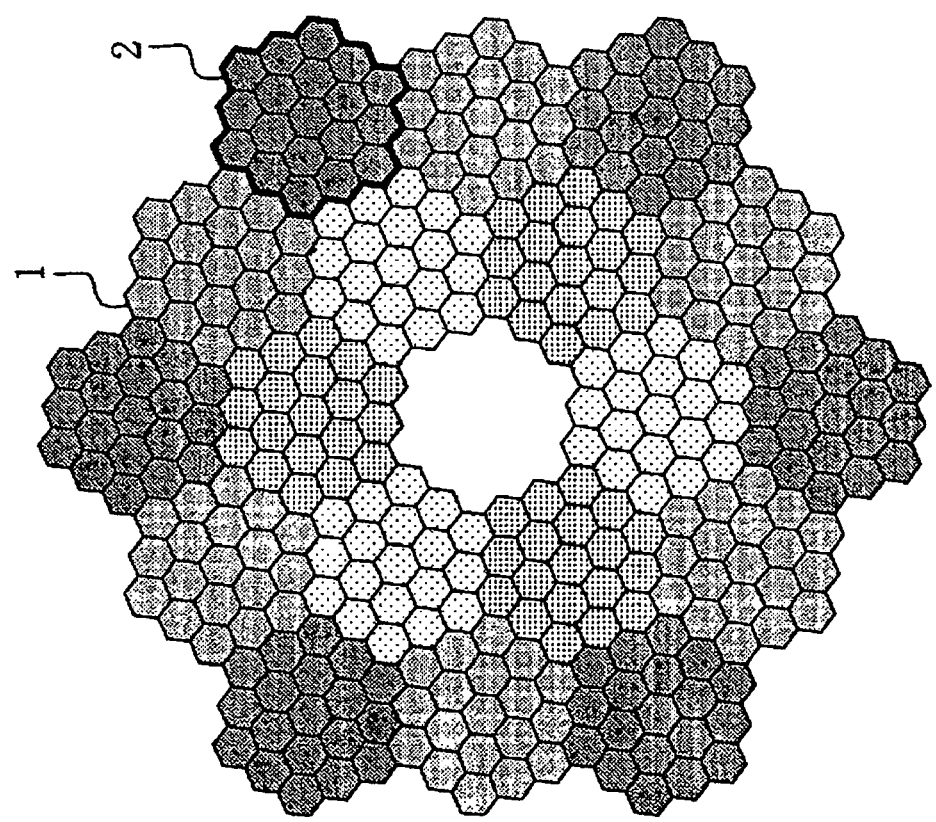

REFLECTOR DEVICE

FIELD OF THE INVENTION

The present invention relates to a reflecting mirror apparatus which is used for a large-sized telescope which receives observation light, millimeter waves, and submillimeter waves from celestial bodies so as to make celestial observations, and which supports the mirror surface of a reflecting mirror consisting of a plurality of segmented mirrors with high precision.

BACKGROUND OF THE INVENTION

Recent years have seen increasingly advances in upsizing of a telescope system which receives observation light and electric waves from space so as to make celestial observations, in order to carry out highly precise observation with a higher resolution. Especially, the dominating telescope system has a reflecting mirror which consists of a single mirror when its opening diameter is of the order of several meters. However, when the reflecting mirror has an opening diameter of the order of several tens of meters or more, since there arises a manufacturing problem if the reflecting mirror consists of a single mirror, a technology for assembling one reflecting mirror by combining a plurality of mirrors (referred to segmented mirrors from here on) into which a single mirror is divided has been developed. For example, JP, 2003-188641,A which is a Japanese patent application discloses a related art reflecting mirror apparatus. This reflecting mirror apparatus disclosed by JP, 2003-188641,A has a single reflecting mirror in which a plurality of segmented mirrors are arranged. These segmented mirrors are supported, via an actuator, by a back structure which is a supporting structure.

A problem with the reflecting mirror apparatus using such a related art supporting method is that since the direction of the optical axis is changed so as to fall within a driving range, a self weight deformation of the back structure resulting from a change in the attitude of the whole of the reflecting mirror apparatus, a deformation of the back structure due to the pressure of winds blowing against the reflecting mirror, and a deformation of the back structure which is caused by a temperature distribution which occurs therein degrades the mirror surface accuracy of the reflecting mirror consisting of the plurality of segmented mirrors. A further problem is that since deformations which thus appear in the back structure may include not only a mode deformation which appears in the whole structure, but also a deformation which appears nonuniformly and locally in the back structure, the deformations are not canceled perfectly by using such a technique as shape maintenance control through estimation of the mode deformation, and therefore there cause displacements of the local positions of the plurality of segmented mirrors and the mirror surface accuracy of the reflecting mirror degrades.
Patent reference 1: JP, 2003-188641,A

DISCLOSURE OF THE INVENTION

Problems to be Solved by the Invention

The present invention is made in order to solve the above-mentioned problems, and it is therefore an object of the present invention to provide a reflecting mirror apparatus that supports the mirror surface of a reflecting mirror which consists of a plurality of segmented mirrors with high precision.

Means for Solving the Problems

A reflecting mirror apparatus in accordance with the present invention includes: a reflecting mirror having a plurality of segmented mirrors arranged therein; a mirror cell for supporting this reflecting mirror; and a reference cell which is a rigid body disposed between the above-mentioned reflecting mirror and the above-mentioned mirror cell, and which serves as a reference surface used for control of a position of the above-mentioned reflecting mirror. The reflecting mirror apparatus in accordance with the present invention further includes three reference cell support mechanisms disposed between the above-mentioned reference cell and the above-mentioned mirror cell, these reference cell support mechanisms restraining the above-mentioned reference cell both in an axial direction of the above-mentioned reflecting mirror and in a direction of a perimeter of the above-mentioned reflecting mirror. The reflecting mirror apparatus in accordance with the present invention further includes a force support mechanism disposed between the above-mentioned reference cell and the above-mentioned mirror cell, for canceling a self weight deformation of the above-mentioned reference cell. Furthermore, the above-mentioned force support mechanism has an axial lever which is disposed at a fulcrum on the above-mentioned mirror cell, and a lateral lever disposed so as to pivot about an end of the above-mentioned axial lever, the above-mentioned lateral lever having an end connected to the reference cell.

In the reflecting mirror apparatus in accordance with the present invention, the above-mentioned reference cell has a honeycomb structure, and the above-mentioned reflecting mirror apparatus has sub mirror cells which are respectively disposed for cells of this honeycomb structure, each of the above-mentioned sub mirror cells supporting a plurality of segmented mirrors. The reflecting mirror apparatus in accordance with the present invention further includes actuators disposed between the above-mentioned sub mirror cells and the above-mentioned segmented mirrors, for positioning the above-mentioned segmented mirrors.

The reflecting mirror apparatus in accordance with the present invention further includes fluid pressure support mechanisms disposed between the above-mentioned reference cell and the above-mentioned mirror cell, for supporting the above-mentioned reference cell.

ADVANTAGES OF THE INVENTION

The reflecting mirror apparatus in accordance with the present invention includes the reflecting mirror having the plurality of segmented mirrors arranged therein, the mirror cell for supporting this reflecting mirror, and the reference cell which is a rigid body disposed between the above-mentioned reflecting mirror and the above-mentioned mirror cell, and which serves as a reference surface used for control of the position of the above-mentioned reflecting mirror. Since the reflecting mirror apparatus controls the position of the reflecting mirror based on the reference cell according to this structure, it can perform positioning control on the reflecting mirror with high precision. The reflecting mirror apparatus in accordance with the present invention further includes the three reference cell support mechanisms disposed between the above-mentioned reference cell and the above-mentioned mirror cell, these reference cell support mechanisms restraining the above-mentioned reference cell both in the axial direction of the above-mentioned reflecting mirror and in the direction of the perimeter of the above-mentioned reflecting mirror. Since the reflecting mirror apparatus controls the position of the reflecting mirror based on the reference cell which is under little influence of the deformation of the mirror cell according to this structure, it can perform positioning control on the reflecting mirror with high precision. The reflecting mirror apparatus in accordance with the present invention further includes the force support mechanism disposed between the above-mentioned reference cell and the above-mentioned mirror cell, for canceling the self weight deformation of the above-mentioned reference cell. Furthermore, the above-mentioned force support mechanism has the axial lever which is disposed at the fulcrum on the above-mentioned mirror cell, and the lateral lever disposed so as to pivot about an end of the above-mentioned axial lever, the above-mentioned lateral lever having an end connected to the reference cell. The reflecting mirror apparatus in accordance with the present invention can suppress the self weight deformation of the reference cell according to this structure, and can perform positioning control on the reflecting mirror with high precision based on the reference cell.

The above-mentioned reference cell has a honeycomb structure, and the reflecting mirror apparatus has the sub mirror cells which are respectively disposed for cells of this honeycomb structure, each of the above-mentioned sub mirror cells supporting the plurality of segmented mirrors. This structure can achieve a weight reduction in the reference cell and can also achieve a weight reduction in the whole of the reflecting mirror apparatus. The reflecting mirror apparatus in accordance with the present invention further includes actuators disposed between the above-mentioned sub mirror cells and the above-mentioned segmented mirrors, for positioning the above-mentioned segmented mirrors. Therefore, the reflecting mirror apparatus can carry out positioning control for every segmented mirror, and can improve the accuracy of the mirror surface of the reflecting mirror.

The reflecting mirror apparatus in accordance with the present invention further includes fluid pressure support mechanisms disposed between the above-mentioned reference cell and the above-mentioned mirror cell, for supporting the above-mentioned reference cell. This structure can reduce the component count and can simplify the structure used for supporting the reference cell as compared with a case where the fixing support mechanisms and the force support mechanism are adopted.

BRIEF DESCRIPTION OF THE FIGURES

[FIG. 1] FIG. 1 is a block diagram showing the structure of a reflecting mirror apparatus in accordance with embodiment 1 of the present invention;

FIG. 2 is a block diagram showing the structure of a reference cell of the reflecting mirror apparatus in accordance with embodiment 1 of the present invention;

FIG. 3 is a block diagram showing an example of the structure of a fixing support mechanism in accordance with embodiment 1 of the present invention;

FIG. 4 is a block diagram showing an example of the structure of a force support mechanism in accordance with embodiment 1 of the present invention;

FIG. 5 is a block diagram showing the structure of the reflecting mirror apparatus including a control system in accordance with embodiment 1 of the present invention;

FIG. 6 is a block diagram showing the structure of a reflecting mirror apparatus in accordance with embodiment 2 of the present invention; and

FIG. 7 is a block diagram showing the structure of a fluid pressure support mechanism of the reflecting mirror apparatus in accordance with embodiment 2 of the present invention.

DESCRIPTION OF REFERENCE NUMERALS

Figure 2:
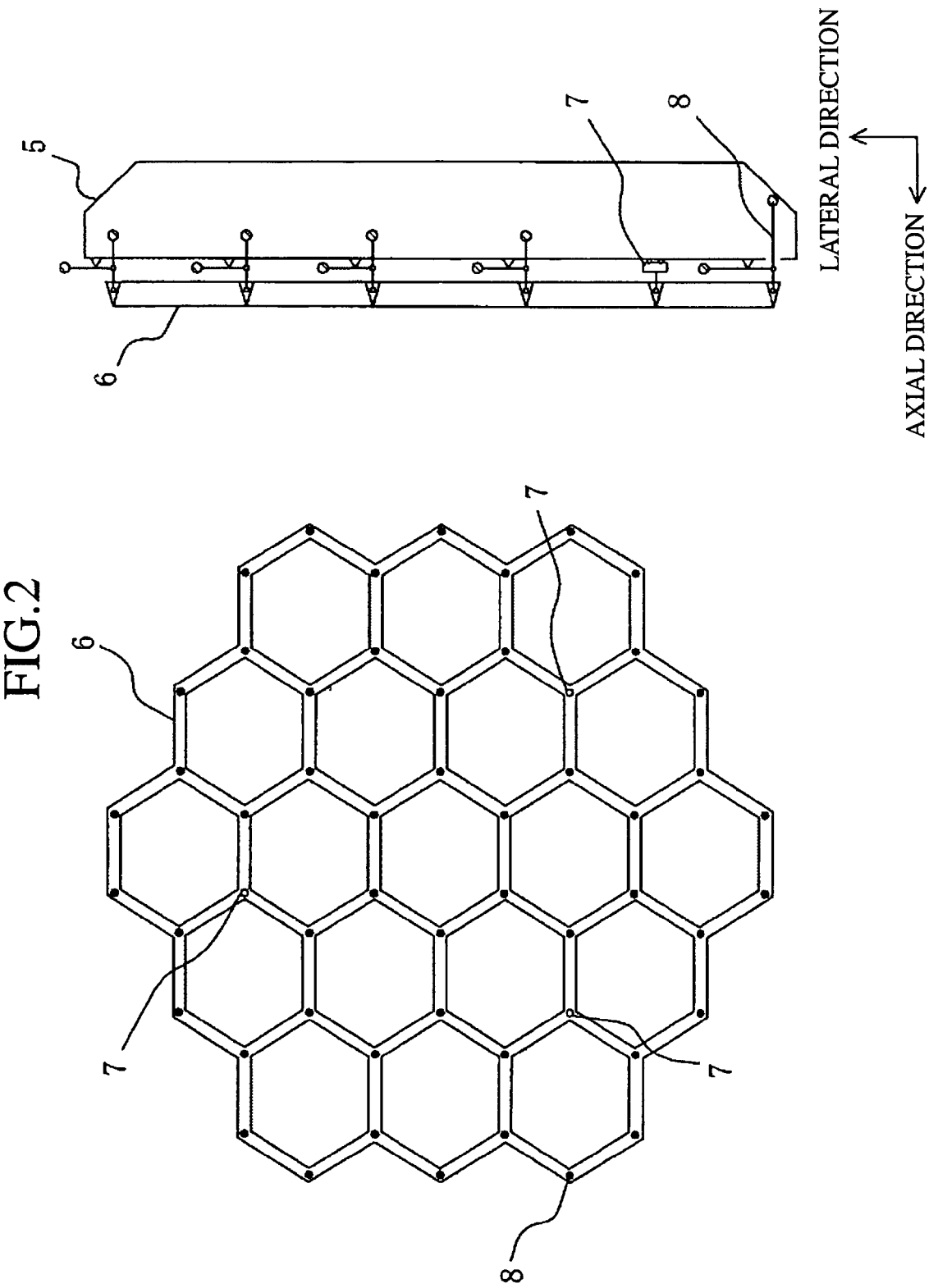
[FIG. 2]

1 Segmented mirror
3 Sub mirror cell
5 Mirror cell
6 Reference cell
7 Reference cell support mechanism
8 Force support mechanism
13 Axial lever
15 Lateral lever
19 Actuator
23 Fluid pressure support mechanism

PREFERRED EMBODIMENTS OF THE INVENTION

Embodiment 1

A reflecting mirror apparatus in accordance with embodiment 1 of the present invention will be explained with reference to FIGS. 1 to 5. FIG. 1 is a block diagram of the reflecting mirror apparatus in accordance with embodiment 1. FIG. 1(*a*) is a front view of the reflecting mirror apparatus, and FIG. 1(*b*) is a side view of the reflecting mirror apparatus. In FIG. 1, reference numeral 1 denotes a segmented mirror, and a plurality of segmented mirrors 1 are arranged on a reflecting mirror surface (for example, on a paraboloid-shaped surface or a paraboloid-shaped surface whose mirror surface is modified). Reference numeral 2 denotes a cluster mirror (i.e., an area surrounded by a thick line shown in FIG. 1) which consists of a plurality of segmented mirrors 1. In the example of FIG. 1, one cluster mirror 2 is formed of 19 segmented mirrors 1, and the reflecting mirror is formed of 18 cluster mirrors 2. Reference numeral 3 denotes a sub mirror cell for supporting a segmented mirror 1, and a sub mirror cell 3 is provided for each of the plurality of cluster mirrors 2. In other words, all segmented mirrors 1 included in the reflecting mirror are grouped into the plurality of cluster mirrors 2, and are supported by a plurality of sub mirror cells 3 which are disposed for the plurality of cluster mirrors 2, respectively. Each of the plurality of cluster mirrors 2 and a corresponding sub mirror cell 3, which are combined into a group, are referred to as a cluster and are designated by reference numeral 4. Reference numeral 5 denotes a mirror cell which supports the plurality of sub mirror cells 3. Therefore, the plurality of segmented mirrors 1 are grouped into a plurality of groups of a cluster 4, and are supported by the plurality of sub mirror cells 3 each of which is a structural unit. The plurality of sub mirror cells 3 are supported by the mirror cell 5 which is a structural unit, and all the segmented mirrors 1 are finally supported by the mirror cell 5. Reference numeral 6 denotes a reference cell which is supported by the mirror cell 5. FIG. 2 is a block diagram showing the reference cell of the reflecting mirror apparatus in accordance with embodiment 1. Reference numeral 7 denotes a fixing support mechanism disposed in the mirror cell 5, for fixing the reference cell 6 to the mirror cell, and reference numeral 8 denotes a force support mechanism disposed in the mirror cell 5, for supporting the reference cell 6 with it being in a weightlessness state. Three fixing support mechanisms 7 are disposed at three points of the reference cell 6, respectively, and each of the three fixing support mechanisms 7 serves as a mechanism for restraining movement of the reference cell through two degrees of freedom. Each of the three fixing support mechanisms restrains movement of the reference cell both in the axial direction of the reflecting mirror, and movement of the reference cell in the direction of the perimeter of the reflecting mirror with respect to the center of the reference cell.

The position of the reference cell 6 in space with respect to the mirror cell 5 is determined by the three fixing support mechanisms 7 respectively disposed at the three positions of the reference cell as mentioned above, for restraining movement of the reference cell 6 through two degrees of freedom. Since the restraint on the reference cell 6 by these fixing support mechanisms 7 is not excess restraint, an internal deformation of the reference cell 6 which is caused by the restraint by the fixing support mechanisms 7 is suppressed. When this reflecting mirror apparatus changes its attitude in order to change the direction of observation, in other words, when the attitude of the mirror cell 5 changes, the attitude of the reference cell 6 also changes according to this change. The force support mechanism 8 suppresses a self weight deformation which is caused by this change in the attitude of the reference cell 6. In other words, the reference cell 6 is supported by the plurality of force support mechanisms 8 disposed in the mirror cell 5 with the reference cell being nearly in a weightlessness state. The reference cell 6 is lightweight, and has a structure which can be, as a whole, handled as a rigid body. FIG. 2 shows the reference cell 6 having a honeycomb structure. This reference cell 6 can have, for example, a triangular trussed structure. When the reference cell 6 is so constructed as to have a honeycomb structure, the reference cell 6 comes down in weight. This weight saving achieves a size reduction and a weight reduction of the fixing support mechanisms 7 and force support mechanisms 8, and also achieves a weight reduction of the mirror cell 5. This results in a weight reduction of the whole of the reflecting mirror. For example, although the plurality of force support mechanisms 8 are disposed at a plurality of joints (each of which is marked with a dot) of the honeycomb structure, as shown in FIG. 2, respectively, the plurality of force support mechanisms 8 can be thinned out by arranging them at appropriate intervals.

Since the reference cell 6 is thus supported by the plurality of force support mechanisms, projections and depressions are prevented from occurring in a surface of the reference cell 6 (i.e., a surface which is perpendicular to the axial axis of the reflecting mirror) in the axial direction of the reflecting mirror due to the self weight deformation, and the surface of the reference cell 6 can be used as a reference surface for control of the positions of the plurality of segmented mirrors 1 and those of the plurality of cluster mirrors 2 in the axial direction of the reflecting mirror. Not only the self weight deformation caused by the above-mentioned change in the attitude of the reflecting mirror apparatus but also a deformation which appears due to both a wind force which the mirror cell 5 receives from outside, and a temperature distribution which occurs in the mirror cell 5 do not affect the reference cell 6 easily. Therefore, the reference cell 6 can be almost handled as a rigid body, and can be used as a reference surface for control of the positions of the plurality of segmented mirrors 1 and those of the plurality of cluster mirrors 2 in the axial direction of the reflecting mirror. Since the reference cell 6 is located between the mirror cell 5 and the reflecting mirror, a major feature of the reflecting mirror apparatus in accordance with the present invention is that the reference cell 6 is not susceptible to a wind force and an application of heat from outside.

Figure 3:
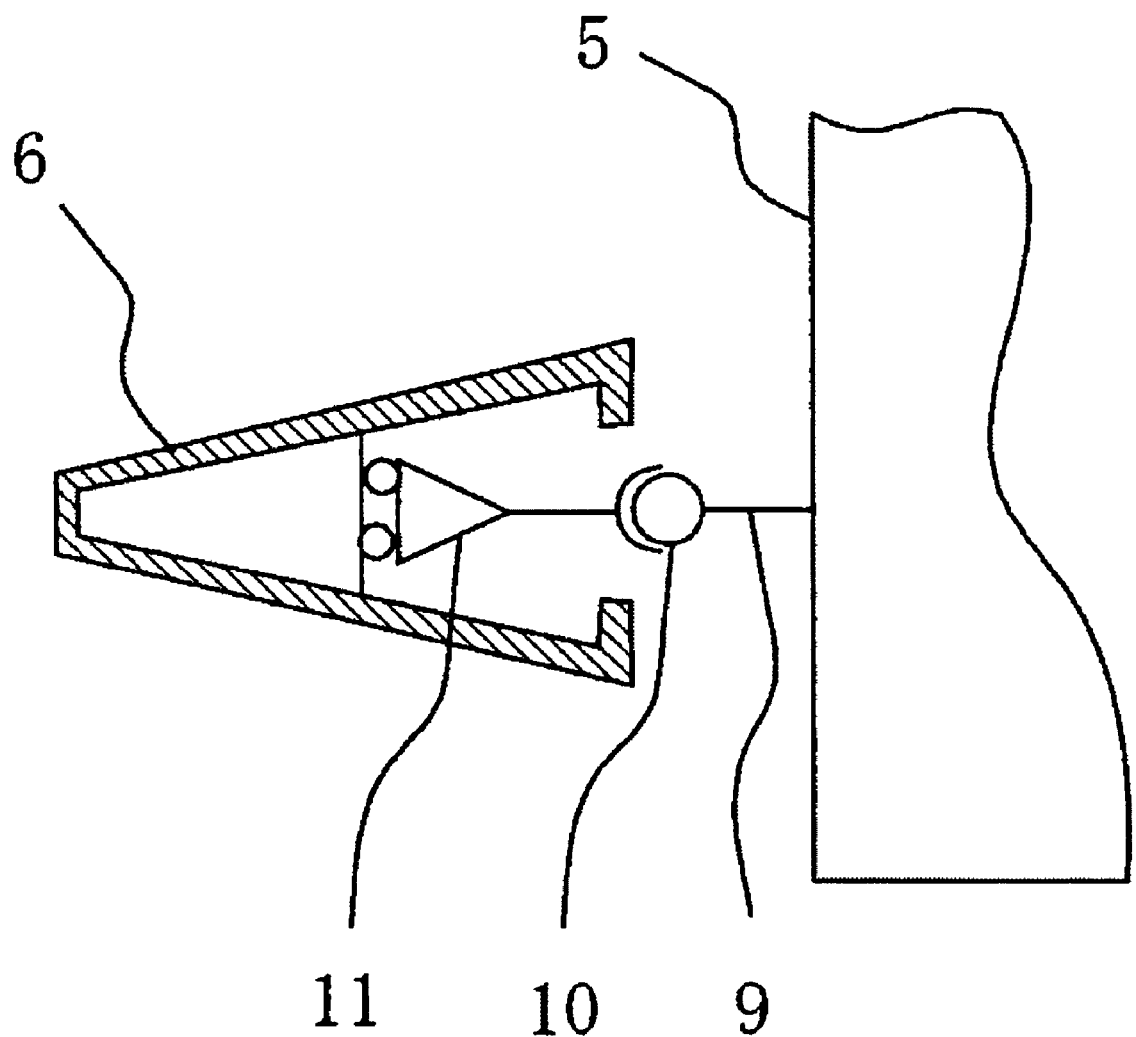
[FIG. 3]

Next, a concrete structure of each fixing support mechanism 7 and each force support mechanism 8 will be explained. FIG. 3 is a block diagram showing an example of the structure of each fixing support mechanism 7. In FIG. 3, reference numeral 9 denotes a supporting base which is fixed to the mirror cell 5, reference numeral 10 denotes a spherical bearing disposed on the supporting base 9, and reference numeral 11 denotes a linear guide disposed between the spherical bearing 10 and the reference cell 6. The supporting base 9, spherical bearing 10, and linear guide 11 can constitute each fixing support mechanism 7. This fixing support mechanism 7 restrains translational movements of the reference cell through three degrees of freedom by using the spherical bearing 10, and releases one of the three degrees of freedom with the linear guide 11. As a result, a single fixing support mechanism restrains translational movements of the reference cell 6 through two degrees of freedom. The directions of the translational movements of the reference cell 6 through two degrees of freedom which are restrained by a single fixing support mechanism are the axial direction of the reflecting mirror and the direction of the perimeter of the reflecting mirror with respect to the reference cell 6. By disposing the three fixing support mechanisms 7 each of which is so constructed as mentioned above on the mirror cell 5, the position of the reference cell 6 can be restrained. Each of the three fixing support mechanisms 7 which restrains the translational movements of the reference cell through two degrees of freedom is not restricted to what is shown in FIG. 3.

Figure 4:
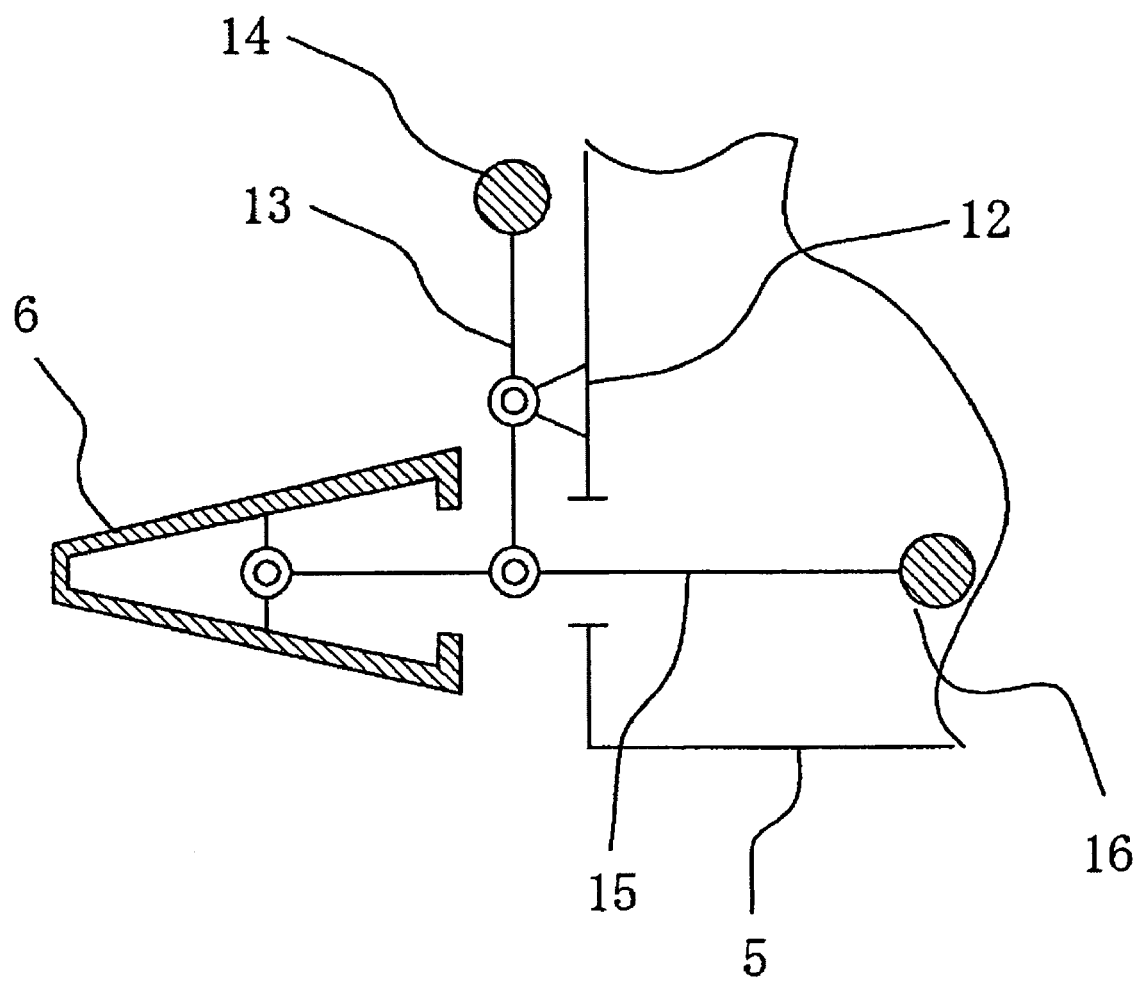
[FIG. 4]

Next, the operation of each force support mechanism 8 will be explained. FIG. 4 is a block diagram showing an example of the structure of each force support mechanism 8. In FIG. 4, reference numeral 12 denotes a supporting base disposed in the mirror cell 5, reference numeral 13 denotes an axial lever which is disposed so as to pivot about the supporting base 12, reference numeral 14 denotes an axial counter weight disposed at an end of the axial lever 13, reference numeral 15 denote a lateral lever which is disposed so as to pivot about another end of the axial lever 13, and reference numeral 16 denotes a lateral counter weight disposed at an end of the lateral lever 15. Another end of the lateral lever 15 is connected to the centroid of the reference cell 6 which is located along the axial direction of the reference cell. Since each force support mechanism is so constructed as mentioned above, the distribution of weight among the axial counter weight 14, lateral counter weight 16, and reference cell 6 and a relationship among their positions are established so that a balance is achieved among the axial counter weight 14, lateral counter weight 16, and reference cell 6 both in a plane perpendicular to the axial direction of the reflecting mirror, and in a plane perpendicular to the lateral direction of the reflecting mirror. This balance can be achieved even if the mirror cell 5 and reference cell 6 are inclined, and the reference cell 6 can be supported while it is placed in a weightlessness state.

Figure 5:
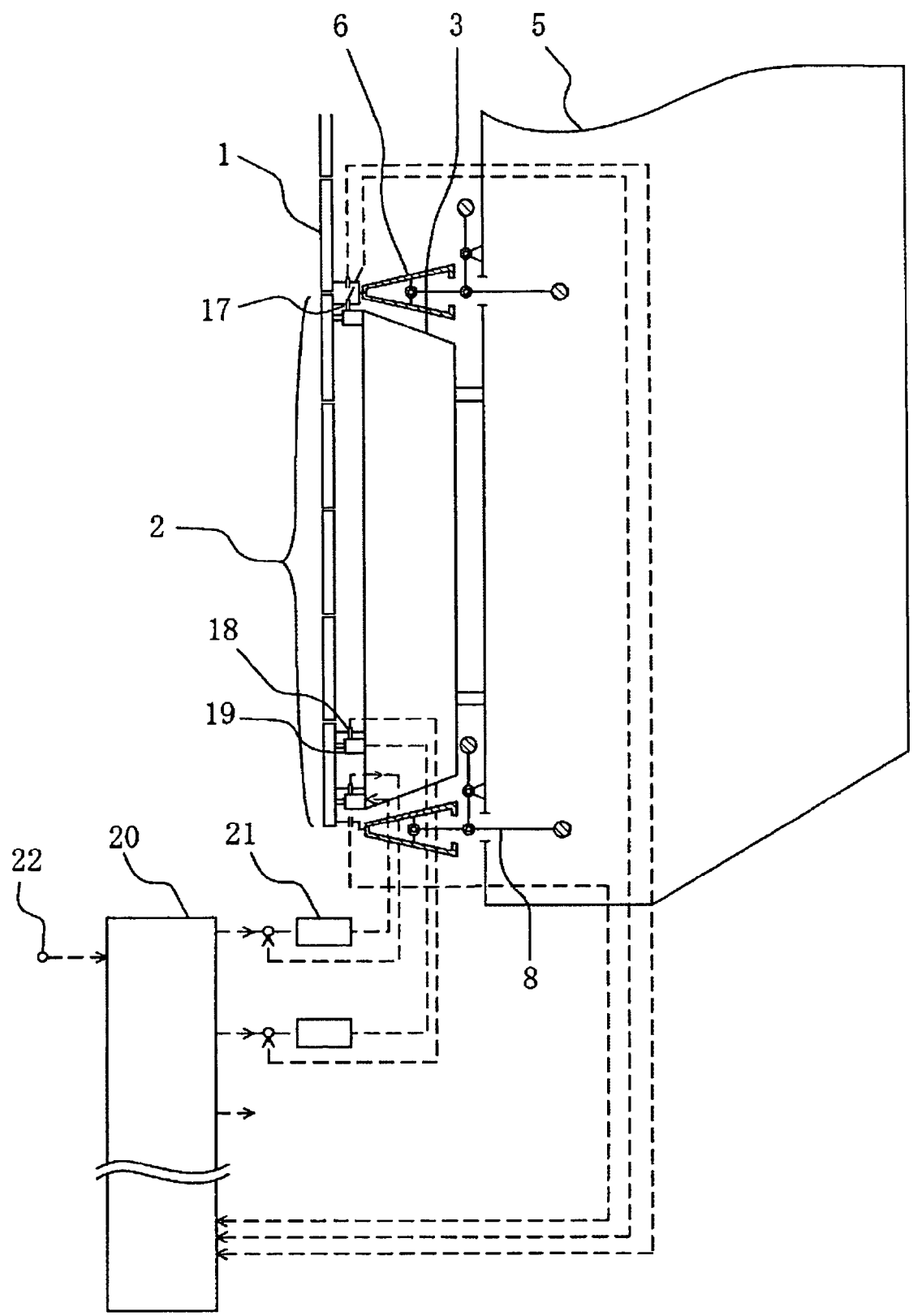
[FIG. 5]

Next, a mechanism of the reflecting mirror apparatus for controlling the positions of the plurality of segmented mirrors 1 and those of the plurality of cluster mirrors 2 will be explained with reference to FIG. 5. FIG. 5 is a block diagram showing the structure of the reflecting mirror apparatus including a control system in accordance with embodiment 1 of the present invention. Reference numeral 17 denotes a cluster position sensor disposed on the reference cell 6, for measuring a position in the axial direction of the reflecting mirror between the reference cell 6 and the perimeter of a corresponding cluster mirror 2, reference numeral 18 denotes a segmented mirror position sensor disposed on a corresponding sub mirror cell 3, for measuring a position in the axial direction of the reflecting mirror between the sub mirror cell 3 and a segmented mirror 1, reference numeral 19 denotes an actuator disposes on the sub mirror cell 3, for changing the position of a corresponding segmented mirror 1 in the axial direction of the reflecting mirror, reference numeral 20 denotes a cluster mirror control unit for receiving plural pieces of position information inputted thereto from a plurality of cluster position sensors 17, and for generating a position control value for each of the plurality of cluster mirrors 2, reference numeral 21 denotes a segmented mirror control unit for providing a control value to a corresponding actuator 19 according to the sum of a command value generated by the cluster mirror control unit 20 and position information generated by a corresponding segmented mirror position sensor, and reference numeral 22 denotes an external input terminal via which an external command value is applied to the cluster mirror control unit 20.

Since the reference cell 6 can maintain its stable shape even if the attitude of the reflecting mirror changes, or the reflecting mirror receives a wind pressure from outside or an application of heat from outside, as mentioned above, the reflecting mirror apparatus can control the positions of the plurality of segmented mirrors 1 and hence those of the plurality of cluster mirrors 2 in the axial direction of the reflecting mirror with respect to the reference cell 6. The reference cell 6 has a honeycomb structure in which the plurality of sub mirror cells 3 are disposed in a plurality of cells thereof, respectively. Each of the plurality of sub mirror cells 3 has a supporting structure which is disposed for supporting a corresponding cluster mirror 2. Although the position of each segmented mirror 1 in the axial direction of the reflecting mirror can be controlled by measuring a positional relationship between each segmented mirror 1 and the reference cell 6 and by determining a displacement in the position of each segmented mirror 1 which is calculated based on the measured positional relationship, a method, as shown in FIG. 5, of measuring a displacement in the position of each cluster mirror 2 with respect to the reference cell 6, and controlling the position of each segmented mirror 1 in the axial direction of the reflecting mirror based on a displacement in the position of each segmented mirror 1 with respect to a corresponding sub mirror cell 3 will be explained hereafter.

The cluster mirror control unit 20 calculates a representative position of each of the plurality of cluster mirrors 2 in the axial direction of the reflecting mirror based on a position determination obtained by the corresponding cluster position sensor 17 disposed in the vicinity of the perimeter of each of the plurality of cluster mirrors 2. The calculated representative position of each of the plurality of cluster mirrors 2 can be the measured position of each of the plurality of cluster mirrors 2 itself which is obtained by the corresponding cluster position sensor 17 located in the vicinity of the perimeter of each of the plurality of cluster mirrors 2. In this case, the representative position of each of the plurality of cluster mirrors 2 is represented by two or more measurements of the position of each of the plurality of cluster mirrors 2. The cluster mirror control unit 20 can determine an amount of displacement which occurs in the face shape of the whole of the reflecting mirror in the axial direction of the reflecting mirror based on the calculated position of each of the plurality of cluster mirrors 2 in the axial direction of the reflecting mirror. The cluster mirror control unit 20 outputs a command value for canceling this displacement to each of the plurality of actuators 19. To be more specific, the cluster mirror control unit 20 operates an actuator 19 corresponding to a cluster mirror position sensor 17 arranged in the vicinity of the perimeter of each of the plurality of cluster mirrors 2 so as to arrange a segmented mirror 1 located at the perimeter of each of the plurality of cluster mirrors 2 at a desired position in the axial direction of the reflecting mirror. The cluster mirror control unit 20 also controls the position of a segmented mirror 1 located in the vicinity of the center of each of the plurality of cluster mirrors 2 based on position determinations in the axial direction of the reflecting mirror which are obtained by a corresponding segmented mirror position sensor 18. When carrying out control of the position of each of the plurality of cluster mirrors 2, the cluster mirror control unit 20 outputs a position control command value to each of the plurality of segmented mirrors 1 included in each of the plurality of cluster mirrors 2, adds this command value and a position measurement in the axial direction of the reflecting mirror obtained by a corresponding segmented mirror position sensor 18, and applies the additional result to a corresponding segmented mirror control unit 21. The plurality of segmented mirror control units 21 provide command values to corresponding actuators 19 to control them, respectively, so that the plurality of segmented mirrors 1 of each of the plurality of cluster mirrors 2 are located at their respective desired positions in the axial direction of the reflecting mirror specified by the position control command values.

Embodiment 2

Figure 6:
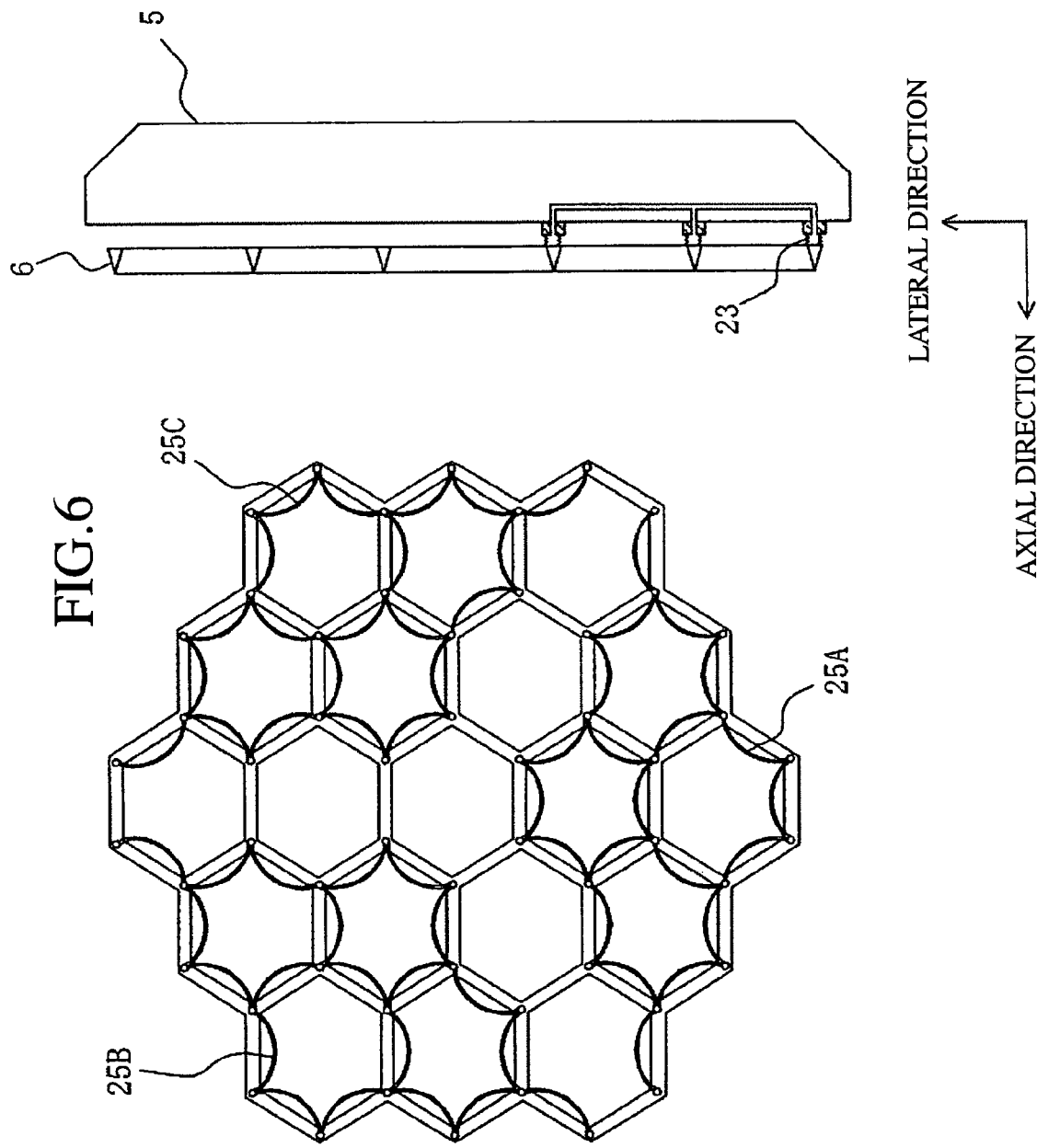
[FIG. 6]

A reflecting mirror apparatus in accordance with embodiment 2 of the present invention will be explained with reference to FIGS. 6 and 7. FIG. 6 is a block diagram of the reflecting mirror apparatus in accordance with embodiment 2. In FIG. 6, reference numeral 23 denotes a fluid pressure support mechanism, and this fluid pressure support mechanism 23 is disposed in a mirror cell 5 for supporting a reference cell 6 using a fluid pressure. A plurality of fluid pressure support mechanisms 23 are arranged in the mirror cell 5 so as to support a plurality of joints of the reference cell 6, respectively. In the reflecting mirror apparatus, the mirror cell 5, reference cell 6, and force support mechanisms 8 shown in FIG. 5, and the fixing support mechanisms 7 which are not shown in FIG. 6 are replaced by the mirror cell 5, reference cell 6, and fluid pressure support mechanisms 23 shown in FIG. 6. Even the reflecting mirror apparatus having this structure can carry out control of the position of the reflecting mirror by using cluster position sensors 17, segmented mirror position sensors 18, actuators 19, a cluster mirror control unit 20, and segmented mirror control units 21, like that in accordance with embodiment 1.

Figure 7:
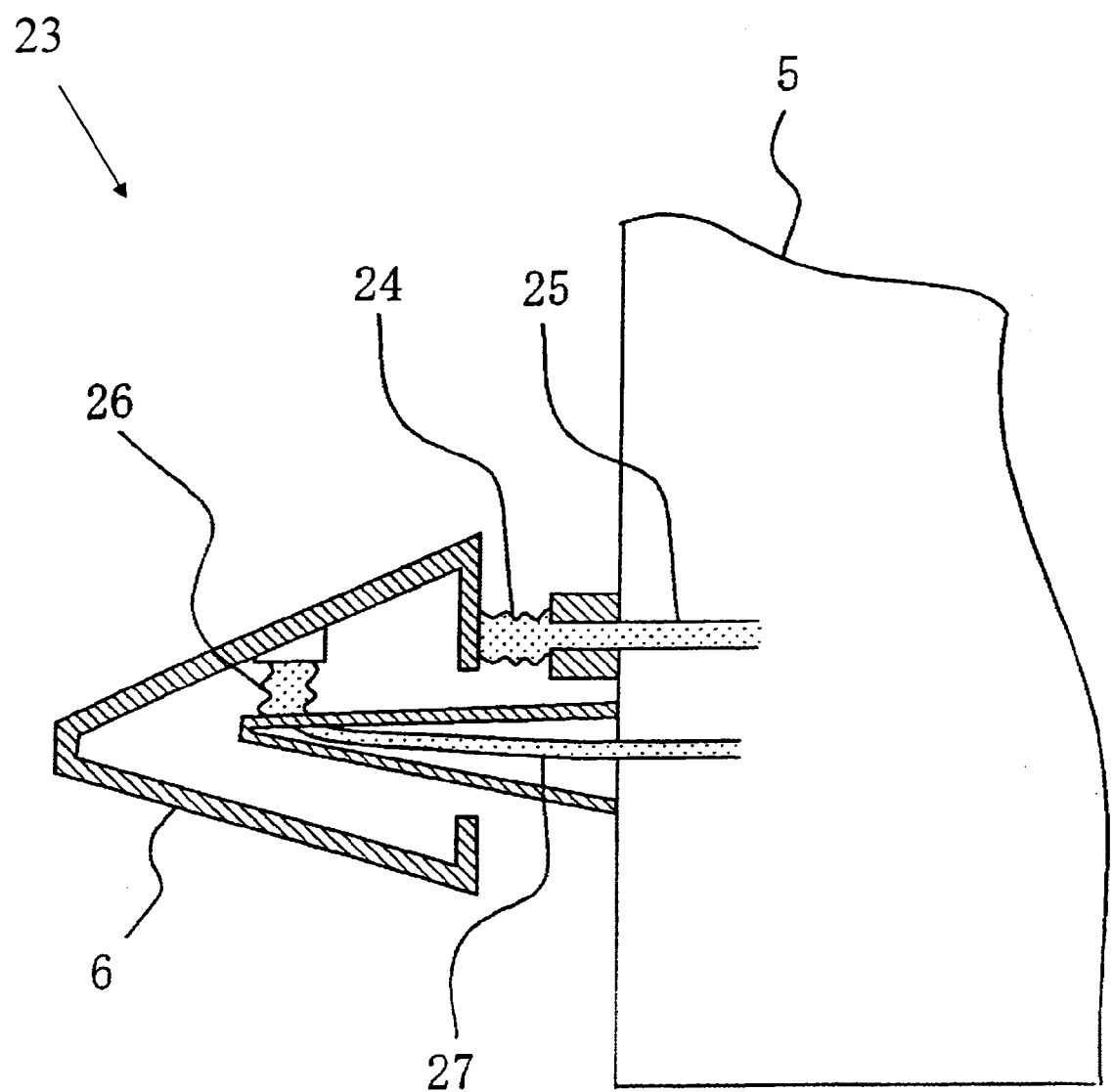
[FIG. 7]

FIG. 7 is a block diagram showing the structure of each fluid pressure support mechanism 23 of the reflecting mirror apparatus in accordance with embodiment 2. Reference numeral 24 denotes an axial bellows for supporting the reference cell 6 in the axial direction of the reflecting mirror, reference numeral 25 denotes an axial pipe connected to the axial bellows 24, reference numeral 26 denotes a lateral bellows for supporting the reference cell 6 in the lateral direction of the reflecting mirror, and reference numeral 27 denotes a lateral pipe connected to the lateral bellows 26. As shown in FIG. 6, a plurality of axial bellows 24 included in the reflecting mirror apparatus are divided into three groups, and axial bellows included in each of the three groups are connected to one another via an axial pipe 25 shown in FIG. 7. In FIG. 6, three groups of axial pipes are designated by reference numerals 25A, 25B, and 25C, respectively. A fluid in axial bellows 24 included in each of the three groups has the same pressure, and therefore supporting reaction forces for supporting the reference cell 6 in the axial direction of the reflecting mirror become equal to one another. The provision of the three groups of axial bellows 24 makes it possible to restrain translational movement of the reference cell 6 in the axial direction of the reflecting mirror and rotation of the reference cell 6 about each of two axes in a surface of the reference cell. The reference cell 6 is also supported by a plurality of lateral bellows 26 included in the reflecting mirror apparatus, and restrains translational movement of the reference cell 6 in the direction of an axis in the surface of the reference cell 6 (i.e., a lateral direction shown in FIG. 6 or an upward or downward direction of FIG. 6). In addition, translational movement of the reference cell 6 in the direction of another axis in the surface of the reference cell 6 (i.e., a direction perpendicular to the lateral direction shown in FIG. 6 or a rightward or leftward direction of FIG. 6) and rotation of the reference cell 6 about the axial direction of the reflecting mirror are restrained by bellows not shown in FIG. 7. While restraining rigid body displacements of the reference cell 6, these bellows can suppress the deformation of the reference cell 6 which is caused by the deformation of the mirror cell 5 and can also suppress the self weight deformation of the reference cell 6 which is caused by change in the attitude of the reflecting mirror apparatus. In addition, compared with the case where the fixing support mechanisms 7 and the force support mechanisms 8 are adopted, the present embodiment can reduce the component count and can simplify the structure used for supporting the reference cell.

INDUSTRIAL APPLICABILITY

The reflecting mirror apparatus in accordance with the present invention can be applied to an optical system or radio telescope apparatus in which a reflecting mirror is disposed, and a communications antenna apparatus in which a reflecting mirror is disposed for the purpose of communications.

The invention claimed is:

1. A reflecting mirror apparatus comprising:
    a reflecting mirror including a plurality of segmented mirrors;
    a plurality of sub mirror cells, each configured to support at least two of the plurality of segmented mirrors;
    a mirror cell, each of the sub mirror cells connected to the mirror cell;
    a rigid body reference cell connected to the mirror cell and disposed between said reflecting mirror and said mirror cell, and which serves as a reference surface; and
    a plurality of position sensors configured to detect a relative position between the rigid body reference cell and a respective segmented mirror, the relative position used to control the position of the respective segmented mirror.

2. The reflecting mirror apparatus according to claim 1, further comprising:
    three reference cell support mechanisms disposed between said reference cell and said mirror cell, and these reference cell support mechanisms restrain said reference cell both in an axial direction of said reflecting mirror and in a direction of a perimeter of said reflecting mirror.

3. The reflecting mirror apparatus according to claim 2, further comprising:
    a force support mechanism disposed between said reference cell and said mirror cell, for canceling a self weight deformation of said reference cell, and said force support mechanism has an axial lever which is disposed at a fulcrum on said mirror cell, and a lateral lever disposed so as to pivot about an end of said axial lever, said lateral lever having an end connected to the reference cell.

4. The reflecting mirror apparatus according to claim 1, wherein said reference cell has a honeycomb structure, and said sub mirror cells are respectively disposed within cells of this honeycomb structure.

5. The reflecting mirror apparatus according to claim 4, further comprising:
    actuators disposed between said sub mirror cells and said segmented mirrors for positioning said segmented mirrors.

6. The reflecting mirror apparatus according to claim 1, further comprising:
    fluid pressure support mechanisms disposed between said reference cell and said mirror cell for supporting said reference cell.

7. A reflecting mirror apparatus comprising:
    a reflecting mirror including a plurality of segmented mirrors;
    a plurality of sub mirror cells, each supporting at least two of the plurality of segmented mirrors;
    a mirror cell, each of the sub mirror cells connected to the mirror cell;
    means disposed between the reflecting mirror and the mirror cell for providing a rigid body reference surface; and
    a plurality of position sensors configured to detect a relative position between the means for providing a rigid body reference surface and a respective segmented mirror, the relative position used to control the position of the respective segmented mirror.

8. The reflecting mirror apparatus according to claim 7, further comprising:
    means disposed between the reference cell and the mirror cell for restraining the reference cell both in an axial direction of the reflecting mirror and in a direction of a perimeter of the reflecting mirror.

9. The reflecting mirror apparatus according to claim 7, further comprising:
    means disposed between the reference cell and the mirror cell for canceling a self weight deformation of the reference cell.

10. The reflecting mirror apparatus according to claim 7, wherein the reference cell has a honeycomb structure, and the sub mirror cells are respectively disposed within cells of this honeycomb structure.

11. The reflecting mirror apparatus according to claim 10, further comprising:
    means disposed between the sub mirror cells and the segmented mirrors for positioning the segmented mirrors.

12. The reflecting mirror apparatus according to claim 7, further comprising:
    means disposed between the reference cell and the mirror cell for supporting the reference cell using fluid power.

\* \* \* \* \*